US011968143B2

(12) United States Patent
Liu et al.

(10) Patent No.: US 11,968,143 B2
(45) Date of Patent: Apr. 23, 2024

(54) ASSIGNMENT OF PHYSICAL RESOURCE BLOCKS TO BASE STATIONS

(71) Applicant: Telefonaktiebolaget LM Ericsson (PUBL), Stockholm (SE)

(72) Inventors: Chunhui Liu, Beijing (CN); Anders Landström, Boden (SE); Qi Zhang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 394 days.

(21) Appl. No.: 17/421,768

(22) PCT Filed: Jan. 11, 2019

(86) PCT No.: PCT/CN2019/071337
§ 371 (c)(1),
(2) Date: Jul. 9, 2021

(87) PCT Pub. No.: WO2020/143021
PCT Pub. Date: Jul. 16, 2020

(65) Prior Publication Data
US 2022/0094498 A1    Mar. 24, 2022

(51) Int. Cl.
*H04L 5/00* (2006.01)
*H04B 17/318* (2015.01)
*H04W 72/541* (2023.01)

(52) U.S. Cl.
CPC ......... *H04L 5/0048* (2013.01); *H04B 17/318* (2015.01); *H04W 72/541* (2023.01)

(58) Field of Classification Search
CPC ..... H04L 5/0048; H04L 5/0073; H04L 5/005; H04L 5/0091; H04B 17/318; H04W 72/541; H04W 16/10
See application file for complete search history.

(56) References Cited

U.S. PATENT DOCUMENTS

2011/0280205 A1* 11/2011 Qin ................... H04W 28/0236
                                                        370/329
2015/0372796 A1   12/2015 Lee et al.
(Continued)

FOREIGN PATENT DOCUMENTS

CN        102340801 A1    2/2012
WO        2011055986 A2   5/2011
(Continued)

OTHER PUBLICATIONS

3GPP TS 36.300 v10.0.0, Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)—Jun. 2010.
(Continued)

*Primary Examiner* — Dady Chery
(74) *Attorney, Agent, or Firm* — Weisberg I.P. Law, P.A.

(57) ABSTRACT

There is provided mechanisms for assigning physical resource blocks to base stations in a cell deployment for transmission of downlink reference signals. A method is performed by a network node. The method comprises obtaining reports from terminal devices in the cell deployment, each report indicating location-wise signal strength measurements of base stations for one of the terminal devices. The method comprises determining, based on the obtained reports, whether to group the physical resource blocks in four sets of physical resource blocks or to group the physical resource blocks in less than four sets of physical resource blocks. The method comprises assigning the determined four or less sets of physical resource blocks to the base stations such that no two adjacent cells in the cell deployment are assigned to the same set of physical resource blocks. The method comprises initiating transmission of the
(Continued)

downlink reference signals from the base stations in the assigned physical resource blocks.

21 Claims, 7 Drawing Sheets

(56) References Cited

U.S. PATENT DOCUMENTS

| | | | | |
|---|---|---|---|---|
| 2017/0201306 | A1* | 7/2017 | Shimezawa | H04W 72/0446 |
| 2019/0028914 | A1* | 1/2019 | Wu | H04W 36/08 |
| 2019/0174384 | A1* | 6/2019 | Kim | H04W 56/001 |

FOREIGN PATENT DOCUMENTS

| | | | |
|---|---|---|---|
| WO | 20140179967 | A1 | 11/2014 |
| WO | 2018 082016 | A1 | 5/2018 |
| WO | 2018 137256 | A1 | 8/2018 |

OTHER PUBLICATIONS

3GPP TS 38.214 v15.1.0, Technical Specification; 3rd Generation Partnership Project; Technical Specification Group Radio Access Network; NR; Physical layer procedures for data (Release 15)—Mar. 2018.

PCT Notification of Transmittal of the International Search Report and the Written Opinion of the International Searching Authority, or the Declaration issued for International application No. PCT/CN2019/071337—dated Sep. 24, 2019.

The Four Color Theorem by Yuriy Brun, MIT Undergraduate Journal of Mathematics—2002.

Uniqueness of Colorability and Colorability of Planar 4-Regular Graphs Are NP-Complete by David P. Dailey; Discrete Mathematics 30 (1980) 289-293—Feb. 8, 1979.

Using Clustering Techniques to Improve Capacity of LTE Networks by Maryam Hajjar et al.; Proceedings of APCC2015—2015.

* cited by examiner

ASSIGNMENT OF PHYSICAL RESOURCE BLOCKS TO BASE STATIONS

PRIORITY

This nonprovisional application is a U.S. National Stage Filing under 35 U.S.C. § 371 of International Patent Application Serial No. PCT/CN2019/071337 filed Jan. 11, 2019 and entitled "ASSIGNMENT OF PHYSICAL RESOURCE BLOCKS TO BASE STATIONS which is hereby incorporated by reference in its entirety.

TECHNICAL FIELD

Embodiments presented herein relate to a method, a network node, a computer program, and a computer program product for assigning physical resource blocks to base stations in a cell deployment for transmission of downlink reference signals.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the base station of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a base station or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the base station and the beam used by the terminal device) is expected to be discovered and monitored by the network using measurements on downlink reference signals, such as channel state information reference signals (CSI-RS), used for beam management.

According to 3GPP TS 38.214 V15.1.0 (3rd Generation Partnership Project; Technical Specification Group Radio Access Network; NR; Physical layer procedures for data (Release 15)), the base stations shall configure downlink reference signals. The terminal devices shall then monitor the downlink reference signals in order to evaluate the beam qualities and report this back to the base stations.

The reference signals for beam management can be transmitted periodically, semi-persistently or aperiodic (event triggered) and they can be either shared between multiple terminal devices or be device-specific. In order for the terminal device to find a suitable TRP beam, the base station transmits the reference signal in different transmission (TX) beams on which the terminal device performs measurements, such as reference signal received power (RSRP), and reports back the N best TX beams (where N can be configured by the network). It is expected that different TX beams are transmitted in different reference signal resources (where each resource is defined in a time/frequency-grid, and that the terminal device reports back N resource indicators, such as CSI-RS resource indicators (CRIs), to inform the base station which TX beams are best. Furthermore, the transmission of the reference signal on a given TX beam can be repeated to allow the terminal device to evaluate a suitable reception (RX) beam.

According to one example the beam management procedure is composed of three phases, see the aforementioned document 3GPP TS 38.214 V15.1.0. In an initial beam selection phase a wide TRP TX beam is initially selected. The initial beam selection phase is sometimes referred to as P1. In a TRP TX beam refinement phase the TRP determines its narrow TX beam according to reporting from the terminal device. The TRP TX beam refinement phase is sometimes referred to as P2. In a UE RX beam refinement phase the narrow RX beam of the terminal device is determined based on the TRP TX beam as determined in the TRP TX beam refinement phase. The UE RX beam refinement phase is sometimes referred to as P3.

If the same radio resources are assigned to the downlink reference signals at different cells, inter-cell interference (ICI) might be induced over those reference signals for terminals able to receive the downlink reference signals from two or more base stations. Even if different radio resources are assigned in time in a Time-division multiplexing (TDM) fashion, the ICI between the reference signals and other signals might remain.

Hence, there is still a need for improved handling of downlink reference signals for beam management.

SUMMARY

An object of embodiments herein is to provide efficient handling of downlink reference signals for beam management not suffering from the issues noted above, or at least where the above noted issues are mitigated or reduced.

According to a first aspect there is presented a method for assigning physical resource blocks to base stations in a cell deployment for transmission of downlink reference signals. The method is performed by a network node. The method comprises obtaining reports from terminal devices in the cell deployment, each report indicating location-wise signal strength measurements of base stations for one of the terminal devices. The method comprises determining, based on the obtained reports, whether to group the physical resource blocks in four sets of physical resource blocks or to group the physical resource blocks in less than four sets of physical resource blocks. The method comprises assigning the determined four or less sets of physical resource blocks to the base stations such that no two adjacent cells in the cell deployment are assigned to the same set of physical resource blocks for transmission of downlink reference signals. The method may further comprise initiating transmission of the downlink reference signals from the base stations in the assigned physical resource blocks.

According to a second aspect there is presented a network node for assigning physical resource blocks to base stations in a cell deployment for transmission of downlink reference signals. The network node comprises processing circuitry. The processing circuitry is configured to cause the network node to obtain reports from terminal devices in the cell deployment, each report indicating location-wise signal strength measurements of base stations for one of the terminal devices. The processing circuitry is configured to cause the network node to determine, based on the obtained reports, whether to group the physical resource blocks in four sets of physical resource blocks or to group the physical resource blocks in less than four sets of physical resource blocks. The processing circuitry is configured to cause the network node to assign the determined four or less sets of physical resource blocks to the base stations such that no two adjacent cells in the cell deployment are assigned to the same set of physical resource blocks for transmission of downlink reference signals. The processing circuitry may be further configured to cause the network node to initiate transmission of the downlink reference signals from the base stations in the assigned physical resource blocks.

According to a third aspect there is presented a network node for assigning physical resource blocks to base stations in a cell deployment for transmission of downlink reference signals. The network node comprises an obtain module configured to obtain reports from terminal devices in the cell deployment, each report indicating location-wise signal strength measurements of base stations for one of the terminal devices. The network node comprises a determine module configured to determine, based on the obtained reports, whether to group the physical resource blocks in four sets of physical resource blocks or to group the physical resource blocks in less than four sets of physical resource blocks. The network node comprises an assign module configured to assign the determined four or less sets of physical resource blocks to the base stations such that no two adjacent cells in the cell deployment are assigned to the same set of physical resource blocks for transmission of downlink reference signals. The network node may comprise an initiate module configured to initiate transmission of the downlink reference signals from the base stations in the assigned physical resource blocks.

According to a fourth aspect there is presented a computer program for assigning physical resource blocks to base stations in a cell deployment for transmission of downlink reference signals, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these network nodes, this computer program, and this computer program product provide efficient assignment of physical resource blocks to base stations.

Advantageously this method, these network nodes, this computer program, and this computer program product allows for efficient handling of downlink reference signals for beam management.

Advantageously this method, these network nodes, this computer program, and this computer program product enable avoidance of interference over the downlink reference signals between the different cells.

Advantageously this method, these network nodes, this computer program, and this computer program product achieve a good balance between measurement precision and ICI avoidance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, operation, step, etc." are to be interpreted openly as referring to at least one instance of the element, apparatus, component, means, module, action, operation, step, etc., unless explicitly stated otherwise. The actions, operations, or steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action, operation, step or feature illustrated by dashed lines should be regarded as optional.

Figure 1:
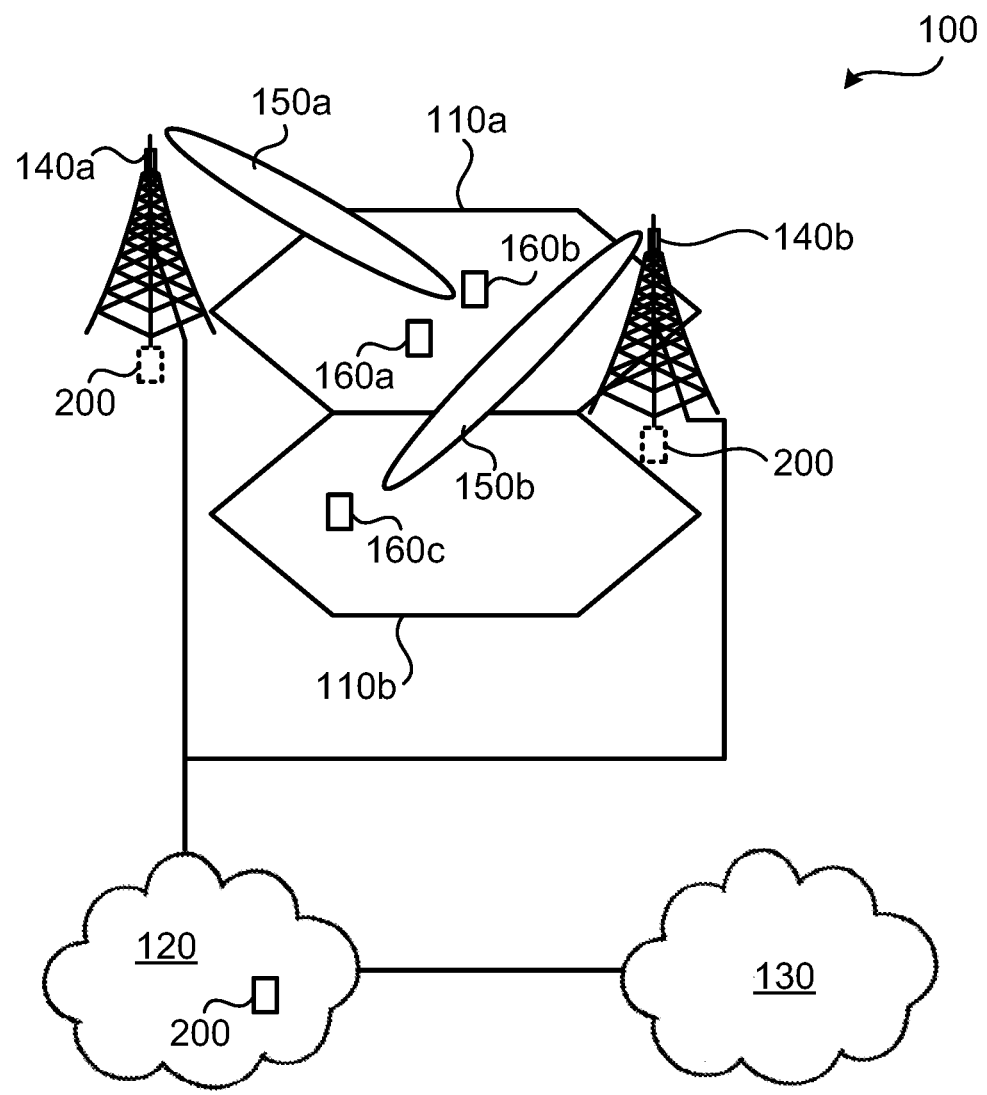
FIGS. 1, 2, and 4 are schematic diagrams illustrating a communications network according to embodiments.

FIG. 1 is a schematic diagram illustrating a communications network 100 where embodiments presented herein can be applied. The communications network 100a could be a third generation (3G) telecommunications network, a fourth generation (4G) telecommunications network, or a fifth (5G) telecommunications network and support any 3GPP telecommunications standard, where applicable.

The communications network 100 comprises base stations 140a, mob. The base stations 140a, 140b collectively form a radio access network. The base stations 140a, 140b are configured to provide network access over one or more radio propagation channels to terminal devices 160a, 160b, 160c in a respective cellular coverage area 110a, 110b, or cells for short. Non-limiting examples of base stations are radio access network nodes, base transceiver stations, node Bs, evolved node Bs, gNBs, access points, and the like.

The base stations 140a, 140b of the radio access network are operatively connected to a core network 120. The core network 120 is in turn operatively connected to a packet data network 130, such as the Internet. The terminal devices 160a, 160b, 160c are thereby, via a respective one of the base stations 140a 140b, enabled to access services of, and exchange data with, the service network 130.

The communications network 100 further comprises at least one network node 200. The functionality, as well as other aspects, of the network node 200 will be disclosed below.

The base stations 140a, 140b communicate with the terminal devices 160a, 160b, 160c in beams, of which one for each base station 140a, 149b is schematically illustrated at reference numerals 150a, 150b. One and the same beam might by each base station 140a, 140b be used to serve two or more terminal devices 160a, 160b, 160c. Alternatively, each terminal device 160a, 160b, 160c is by the base stations 140a, 140b served in its own beam. As noted above, downlink reference signals as transmitted during beam management, can be used in order to determine which beam to use by the base stations 140a, 140b for communication with the terminal device, or devices, 160a, 160b, 160c within its cellular coverage area 110a, 110b. That is, in order for the base stations 140a, 140b to find suitable beams for communication with the terminal devices 160a, 160b, 160c, the base stations 140a, 140b send downlink reference signals for beam management in candidate beams. Each terminal device 160a, 160b, 160c then measures quality values for those beams and report these back to the base station 140a, 140b from which it has received the downlink reference signal (or signals), which decides which beam that should be used for transmission of control information and data traffic. As mentioned above; if the same radio resources are assigned to downlink reference signals for base stations 140a, 140b serving neighboring cells 110a, 110b, this could lead to ICI and degradation on the beam measurement.

In some aspects, in order to avoid such ICI, different resources, such as physical resource blocks (PRBs) are allocated to downlink reference signals for beam management to base stations 140a, 140b serving neighboring cells 110a, 110b. Those downlink reference signals can then be transmitted at the same time from all the base stations, whilst still avoiding ICI between the downlink reference signals and traffic for control information and data.

Figure 2:
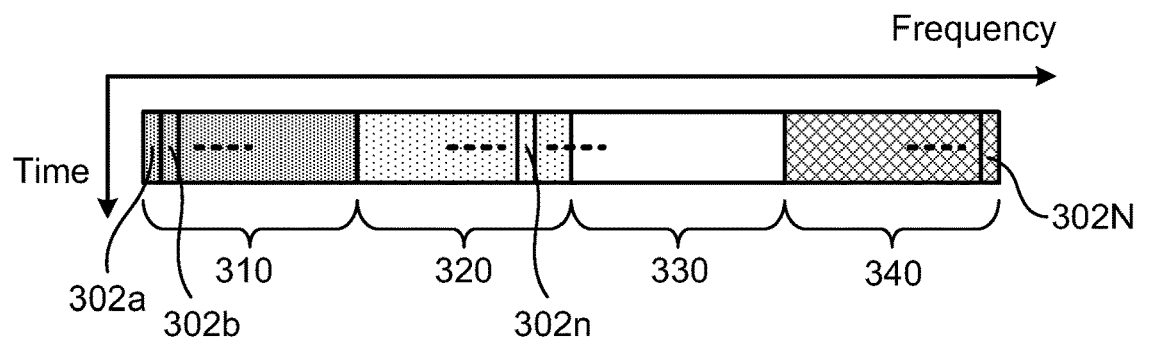
Figure 2:
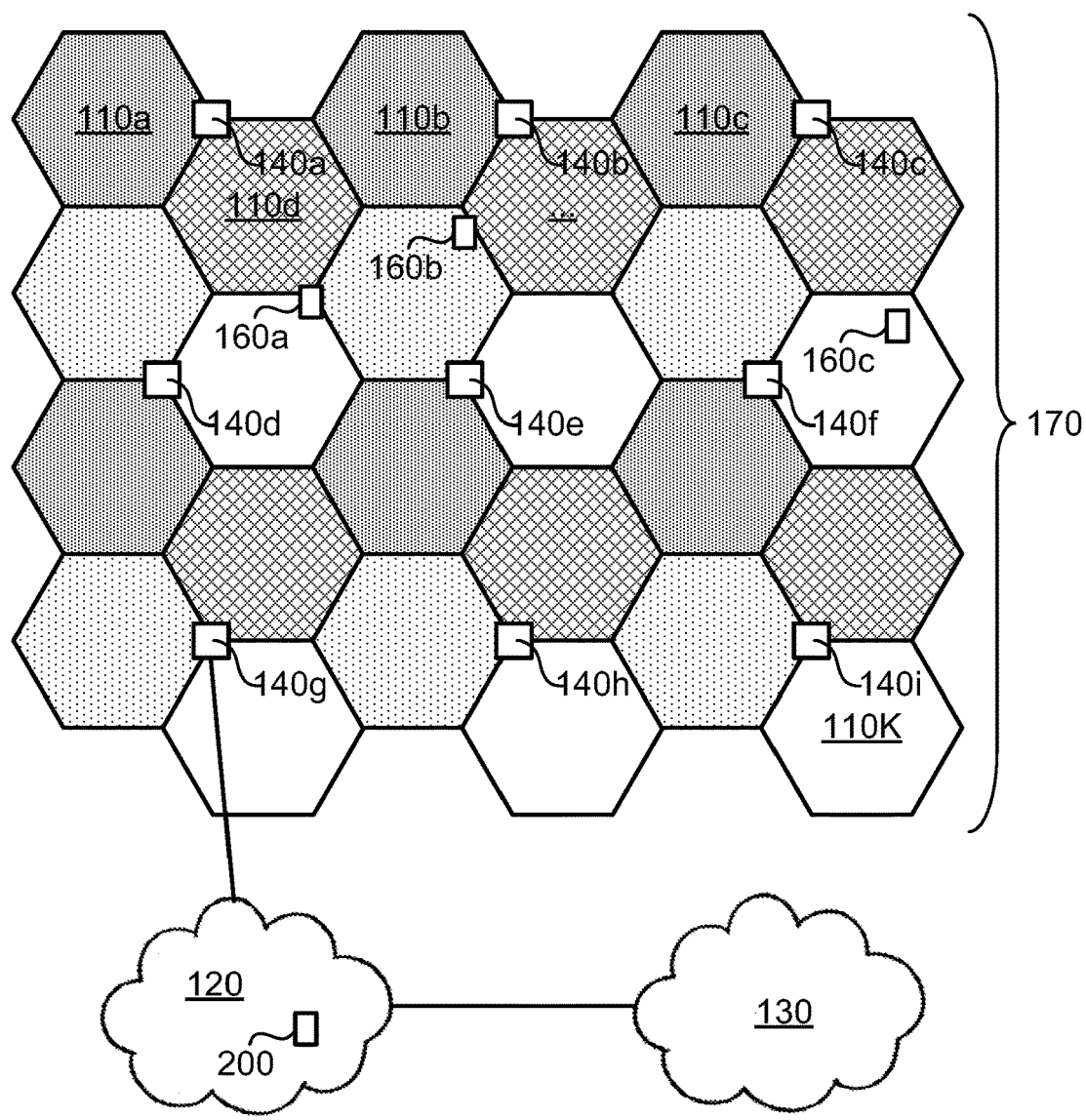

FIG. 2 schematically illustrates a cell deployment 170 of the communications network 100 in FIG. 1 where the cellular coverage areas 110a, 110b of FIG. 1 thus form two of the K cells 110a, 110b, 110c, 110d, . . . , 110K of the cell deployment 170, and where the cells are served by base stations 140a-140i. For illustrative purposes, in the example of FIG. 2, only base station 140g is operatively connected to the core network 120. However, as the skilled person understands, also the remaining base stations 140a-140f, 140h, 140i are operatively connected to the core network 120. As the skilled person also understands, there might be an operational connection between two or more of the base stations 140a-140i, which is not illustrated in FIG. 2. As illustrated in the top part of FIG. 2, which shows PRBs 302a, 302b, . . . , 302n, . . . , 302N, the PRBs have been grouped into four sets of PRBs 310, 320, 330, 340. In the illustrative example of FIG. 2, PRB 302b and PRB 302b belong to PRB set 310, PRB 302n belongs to PRB set 320, and PRB 302N belongs to PRB set 340. As an example, there might be 272 PRBs in total (i.e., N=272), and thus each set might have 272/4=68 of these PRBs. One of these sets of PRBs 310, 320, 330, 340 is then used for transmission of the downlink reference signals in the cells according to its matching color. That is, as an example, PRBs in the set 330 are used for transmission of the downlink reference signals in the cell formed by the radio access network 110. Terminal device 160b is located on the border between a cell in which the set 320 is used and a cell in which the set 340 is used. Terminal device 160c is located in a cell in which the set 330 is used.

The four color theorem states that given any separation of a plane into contiguous regions, producing a figure called a map, no more than four colors are required to color the regions of the map so that no two adjacent regions have the same color. For any cell deployment, the PRBs could therefore be grouped into a maximum of four sets to avoid ICI. However, it is not always optimal to divide radio resources into four sets allocated to different cells. In some cell deployments it could be that less than four sets of PRBs are required, whilst still avoiding ICI. As will be demonstrated below, for the cell deployment in the example of FIG. 2, only three sets of PRBs are needed to avoid ICI.

The embodiments disclosed herein relate therefore to mechanisms for assigning physical resource blocks 302a-302N to base stations 140a-140i in a cell deployment 170 for transmission of downlink reference signals. In order to obtain such mechanisms there is provided a network node 200, a method performed by the network node 200, a computer program product comprising code, for example in the form of a computer program, that when run on a network node 200, causes the network node 200 to perform the method.

Figure 3:
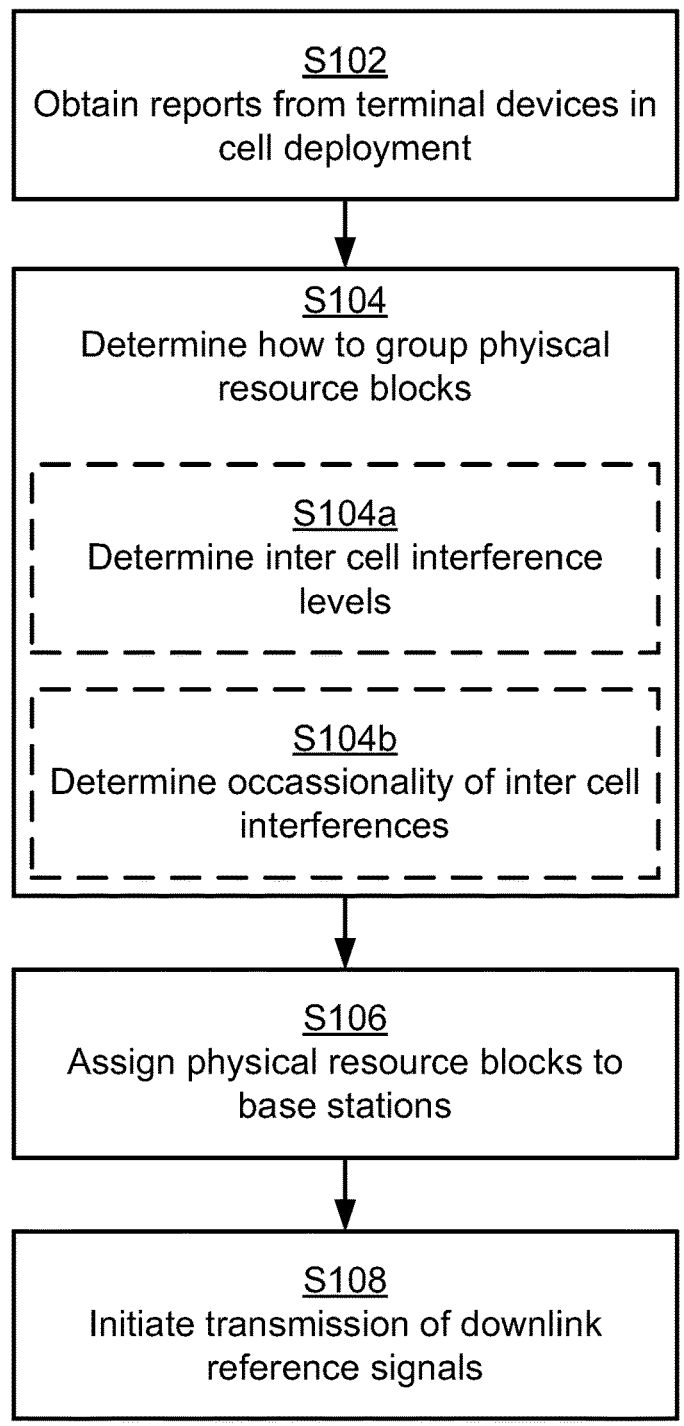
FIG. 3 is a flowchart of methods according to embodiments.

FIG. 3 is a flowchart illustrating embodiments of methods for assigning PRBs 302a-302N to base stations 140a-140i in a cell deployment 170 for transmission of downlink reference signals. The methods are performed by the network node 200. The methods are advantageously provided as computer programs 720.

The assignment of PRBs 302a-302N to the base stations 140a-140i is based on reports of signal strength measurements. In particular, the network node 200 is configured to perform action S102:

S102: The network node 200 obtains reports from terminal devices 160a, 160b, 160c in the cell deployment 170. Each report indicates location-wise signal strength measurements of base stations 140a-140i for one of the terminal devices 160a, 160b, 160c.

These reports are then used by the network node to group the PRBs 302a-302N in sets. In particular, the network node 200 is configured to perform action S104:

S104: The network node 200 determines, based on the obtained reports, whether to group the PRBs 302a-302N in four sets of physical resource blocks 310-340 or to group the physical resource blocks 302a-302N in less than four sets of physical resource blocks 350-370. Further details of how to determine how many sets the PRBs 302a-302N are to be grouped into will be disclosed below.

Each base station 140a-140i is assigned one of the sets of PRBs 302a-302N once the PRBs 302a-302N have been grouped. In particular, the network node 200 is configured to perform action S106:

S106: The network node 200 assigns the determined four or less sets of PRBs 302a-302N to the base stations 140a-140i. The determined four or less sets of PRBs 302a-302N are assigned such that no two adjacent cells in the cell deployment 170 are assigned to the same set of physical resource blocks 302a-302N for transmission of the downlink reference signals.

Transmission of the downlink reference signals can then be initiated. In some embodiments, the network node 200 may be configured to perform action S108:

S108: The network node 200 initiates transmission of the downlink reference signals from the base stations 140a-140i in the assigned physical resource blocks 302a-302N.

In other examples the base stations may autonomously initiate the transmission of the downlink reference signals in the physical resources assigned to them for transmission of downlink reference signals by the network node; in which case S108 is not performed by the network node.

By using four sets of PRBs only when needed, this method allows for more PRBs per base station to be allocated for downlink reference signals, which can increase the overall performance of beam measurement.

Embodiments relating to further details of assigning physical resource blocks 302a-302N to base stations 140a-140i in a cell deployment 170 for transmission of downlink reference signals as performed by the network node 200 will now be disclosed.

There could be different types of downlink reference signals. According to an embodiment the downlink reference signals are channel state information reference signals (CSI-RS). In other examples the downlink reference signals are synchronization signal block (SSB) signals.

There could be different use of the downlink reference signals. According to an embodiment the downlink reference signals are to be transmitted during a beam management procedure and are dedicated for beam measurement purposes.

There could be different types of signal strength measurements. For example, each signal strength measurement could be given in terms of RSRP. That is, according to an embodiment the signal strength measurements are provided in terms of RSRP values.

According to an embodiment the PRBs 302a-302N are grouped in four sets of PRBs 310-340 when the reports from at least one of the terminal devices 160a, 160b, 160c indicate RSRP values higher than a power threshold value for more than three base stations 140a-140i. Further, according to an embodiment the PRBs 302a-302N are grouped in 0<K<4 sets of PRBs 310-340 when the reports from at least one of the terminal devices 160a, 160b, 160c indicate RSRP values higher than a power threshold value for more than K−1 base stations 140a-140i and no report indicates RSRP values higher than the power threshold value for more than K base stations 140a-140i.

Thereby, if there are enough terminal devices 160a, 160b, 160c reporting RSRP values for three base stations 140a-140i in neighboring cells and if all these RSRP values are higher than the power threshold value, the PRBs 302a-302N are grouped in four sets of PRBs 310-340. Otherwise, at most three sets are sufficient. The power threshold value might be set to an absolute value or to a value relative to the RSRP value of the strongest reported RSRP value.

There could be different ways to group the PRBs 302a-302N. Aspects relating thereto will now be disclosed. According to some aspect the PRBs 302a-302N are grouped by being divided in frequency. Particularly, according to an embodiment the PRBs 302a-302N per time unit are frequency-wise grouped in the four or less sets of PRBs 302a-302N.

There could be different ways to frequency-wise group the PRBs 302a-302N. In some aspects all groups are contiguous in frequency. That is, according to an embodiment the PRBs 302a-302N are grouped in frequency-wise contiguous groups of PRBs 302a-302N. In other aspects all groups are non-contiguous in frequency. That is, according to an embodiment the PRBs 302a-302N are grouped in frequency-wise non-contiguous groups of PRBs 302a-302N. In some aspects there is a mix of groups that contiguous and groups are non-contiguous in frequency. Particularly, according to an embodiment the PRBs 302a-302N are grouped in a mix of frequency-wise contiguous groups and non-contiguous groups of PRBs 302a-302N.

Further in this respect, a regression method might be used to allocate sets of PRBs to the cells such that no two adjacent cells in the cell deployment 170 are assigned to the same set of physical resource blocks 302a-302N. While determining which set of PRBs to assign to one cell, it is checked which sets of PRBs have been assigned to the neighboring cells in order to find one set of PRBs not used by any neighboring cells. The complexity for this procedure is $O(N^4)$, where N−1 is the number of neighboring cells.

Figure 4:
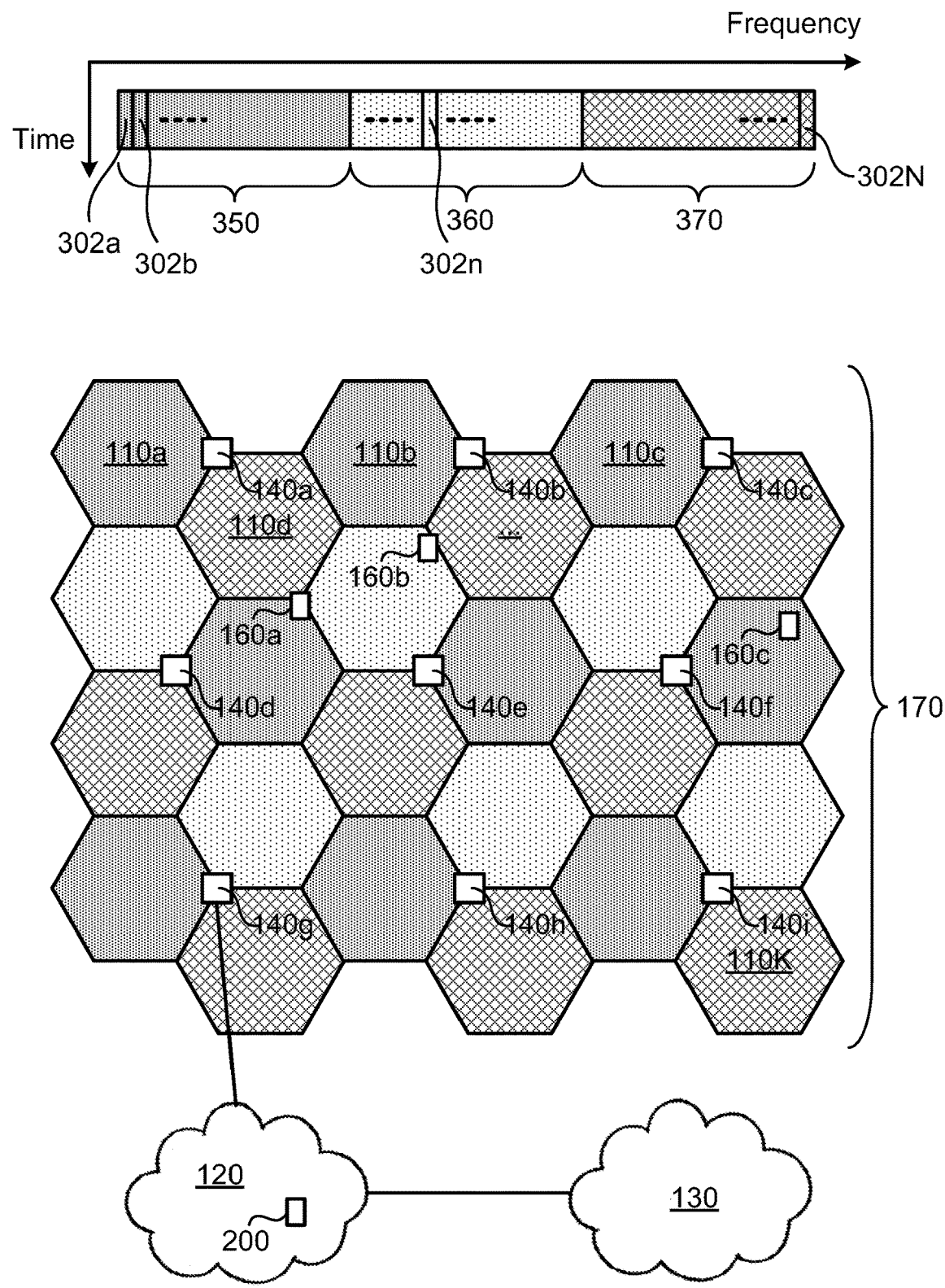

FIG. 4 schematically illustrates the same cell deployment 170 as in FIG. 2, but where the PRBs 302a, 302b, . . . , 302n, 302N have been grouped into three sets of PRBs 350, 360, 370, for the same total number N of PRBs as in the example of FIG. 2. In the illustrative example of FIG. 4, PRB 302b and PRB 302b belong to PRB set 350, PRB 302n belongs to PRB set 360, and PRB 302N belongs to PRB set 370. Hence, if the number of PRBs are divided equal between all sets, each set of PRBs 350, 360, 370 have more PRBs than each set of PRBs 310, 320, 330, 340. One of these sets of PRBs 350, 360, 370 is then used for transmission of the downlink reference signals in the cells according to its matching color. That is, as an example, PRBs in the set 370 are used for transmission of the downlink reference signals in the cell formed by the radio access network no. Terminal device 160b is located on the border between a cell in which the set 360 is used and a cell in which the set 370 is used. Terminal device 160c is located in a cell in which the set 350 is used.

Terminal device 160a is located on the border between a cell in which the set 350 is used, a cell in which the set 360 is used, and a cell in which the set 370 is used. For example; if terminal device 160a reports similar RSRP values for three neighboring cells (including its serving cell), it is sufficient that the PRBs among those three cells are grouped into three sets of PRBs.

In general terms, the more PRBs that are used for measurement, the more accurate the measurement become. Thus, as many PRBs as possible should, per cell (or equivalently, per base station), be allocated to the downlink reference signals to have the best measurement result. That is, the total number of PRBs in each set should be as large as possible, and thus the number of set of PRBs should be as small as possible.

In some aspects the signal strength measurements are neighbouring cell measurements. Particularly, according to an embodiment the signal strength measurements for the terminal devices 160a, 160b, 160c are neighbouring cell measurements of its serving base station 140a-140i and of any neighbouring base station 140a-140i at the given location (of the terminal devices 160a, 160b, 160c) in the cell deployment 170.

The so-called Automatic Neighbor Relation (ANR) procedure lets the base station 140a-140i in each cell detect its neighbors and update its neighbor cell list automatically. A base station can order a served terminal device 160a, 160b, 160c to check for the existence of transmissions from other base stations 140a-140i (and thus from base stations 140a-

140$i$ serving cells surrounding the cell in which the terminal device 160$a$, 160$b$, 160$c$ is served). The network node 200, or base station 140$a$-140$i$ receiving the report can therefrom extract the neighbor cell information. According to one example the ANR procedure is as follows. First, the base station sends a Measurement Command (Measurement Control) to one of its served terminal devices to perform the detection/measurement of cells around it. Second, the terminal device detects, by performing performs measurements on signals transmitted from base stations in surrounding cells, any surrounding cells and reports it to the base station which sent the measurement command in a measurement report. Third, upon reception of the measurement report, the base station extracts the cell information from the measurement report and updates its neighbor cell list.

In some aspects the ANR procedure is used to relieve the network operator from the burden of manually managing neighbor relations. The base stations 140$a$-140$i$ might therefore be configured to configure neighboring cell measurement to the served terminal devices 160$a$, 160$b$, 160$c$. Hence, according to an embodiment, the reports are obtained in response to the terminal devices 160$a$, 160$b$, 160$c$ having performed an ANR procedure. Each terminal device 160$a$, 160$b$, 160$c$ might then measure and report the status of neighboring cells (and also the status of the serving cell) back to its serving base station.

In some aspects the groups are determined based on ICI levels. In particular, according to an embodiment the network node 200 is configured to perform (optional) action S104$a$ as part of action S104:

S104$a$: The network node 200 determines inter cell interference levels for the base stations 140$a$-140$i$ from the signal strength measurements.

Whether to group the PRBs 302$a$-302N in four sets of PRBs 310-340 or to group the PRBs 302$a$-302N in less than four sets of PRBs 350-370 is then determined in accordance with the inter cell interference levels.

A terminal device 160$a$, 160$b$, 160$c$ might receive signals from several base stations in neighboring cells, whilst their signals might not be strong enough to induce ICI. On the other hand, even though there could exist certain locations where strong interfering signals are received from several base stations in neighboring cells, only a limited number of terminal devices may occasionally encounter ICI. For the sake of mobility, the terminal devices 160$a$, 160$b$, 160$c$ are configured to perform neighboring cell measurement. How to perform neighboring cell measurement has been disclosed above. If a terminal device has successfully performed an attach procedure with one of the base stations, a measure gap periodically appears between instances where the terminal device performs periodic neighboring cell measurement according to some telecommunication systems. In the long term evolution (LTE) telecommunication system this gap is 6 ms. The network node 200 might therefore be configured to accumulate these reports in order to have a statistical view of any possible ICI.

Let $P_m[j][t]$ denote the RSRP of the downlink reference signals from cell $j \in \Phi_m$ as measured by terminal device m at time t. If implementation complexity is not considered, the network node 200 might consider reports from all attached terminal devices 160$a$, 160$b$, 160$c$. If the implementation complexity is a constraint, then the network node 200 might only consider reports from M attached terminal devices 160$a$, 160$b$, 160$c$, and where the value of M can be configurable. Particularly, according to an embodiment the determining (as in any of actions S104, S104$a$, S104$b$) is only made for the signal strength measurements of those base stations 140$a$-140$i$ for which the signal strength measurements have RSRP values higher than a power threshold value.

The set $\Phi_m$ might thus only contain those neighboring cells for which the RSRP by terminal device m has been measured to be higher than the power threshold value. Multiple terminal devices 160$a$, 160$b$, 160$c$ may report the same set of neighboring cells. The network node 200 might maintain a list of sets $\{\Phi_m, m=1, \ldots, M\}$ for M terminal devices.

The average received power over different cells at time t is denoted $\overline{P_m}[t]$ and can be determined as:

$$\overline{P_m}[t] = \frac{1}{|\Phi_m|} \sum_{j \in \Phi_m} P[j][t].$$

Further, the power variance over different cells at time t is denoted $\sigma_m^2[t]$ and can be determined as:

$$\sigma_m^2[t] = \frac{1}{|\Phi_m|} \sum_{j \in \Phi_m} (\overline{P}[t] - P[j][t])^2.$$

If the coefficient of variation, determined as $\sigma_m[t]/\overline{P_m}[t]$, is small, this implies that signal strengths of the transmission from base stations of neighboring cells are close to each other and that terminal device m might experience high ICI, and vice versa. Hence, the power threshold value might be set to adjust this coefficient of variation.

However, it might be that one or more of the terminal devices 160$a$, 160$b$, 160$c$ reports a set of neighboring cells only occasionally, due to temporary burst-like behavior of the radio propagation channel. The network node 200 might therefore be configured to estimate the frequency of occurrence, herein after referred to as the occassionality of the inter cell interference. Here the occassionality of inter cell interference thus represents the frequency of occurrence of inter cell interference, or in other words how often (in time) that inter cell interference is experienced. In particular, according to an embodiment the network node 200 is configured to perform (optional) action S104$b$ as part of action S104:

S104$b$: The network node 200 determines the occassionality of inter cell interference for the base stations 140$a$-140$i$ from the signal strength measurements.

Whether to group the PRBs 302$a$-302N in four sets of PRBs 310-340 or to group the PRBs 302$a$-302N in less than four sets of PRBs 350-370 is then determined in accordance with the occassionality of inter cell interference.

In order to reduce the effects of the occassionality of inter cell interference, the signal strength measurements might be averaged over time. Particularly, according to an embodiment the determining (as in any of actions S104, S104$a$, S104$b$) only is made for the signal strength measurements as averaged over time.

One way to average the signal strength measurements over time is to filter the signal strength measurements. In this respect, in order to avoid bursting or occasional reporting of RSRP values, the signal strength measurements for each set $\Phi_m$ can be low-pass filtered as follows:

$$g_m[t] = (1 - \alpha)g_m[t-1] + \alpha \frac{\sigma_m[t]}{\overline{P_m}[t]},$$

-continued $$\alpha \in (0, 1).$$

The filtered coefficient of variation g[j][t] might then be used as the merit to determine how many sets of PRBs the PRBs shall be grouped into. Let G denote the threshold for this filtered coefficient of variation. If there exists at least one $g_m[t]>G$ and $|\Phi_m|>3$, m=1, . . . , M, then the sets of PRBs are grouped into 4 sets. Moreover, $g_m[0]$ is initialized to a value much lower than G. If $g_m[t]$ has not been updated for a long period time, such as several hours, $g_m[t]$ might be reset to the initial value.

In some aspects the cells are divided into different clusters. Hence, according to an embodiment, the cell deployment 170 is a cluster of cells that are part of a cellular network. For example, cells confined to a particular geographical location, such as in a city, might define one cluster, and cells surrounding that particular geographical location, such as rural surroundings to the city, might define two or more clusters. How to divide the cells into clusters depends inter alia on factors such as density of the terminal devices (i.e., how many terminal devices that on average are located within a predefined location), the total amount of terminal devices data traffic demands and data traffic patterns, the geometry of the physical environment in which the cells are deployed, and so on. The methods according any of the above disclosed embodiments might then be performed individually per cluster, assuming that the different clusters are sufficiently separated such as when there is no ICI between different clusters.

Further, the network node 200 might be configured to repeatedly assign PRBs 302a-302N to the base stations 140a-140i in the cell deployment 170 for transmission of downlink reference signals. In particular, according to an embodiment, the obtaining (in action S102), the determining (in action S104), and the assigning (in action S106) are periodically repeated. Transmission of the downlink reference signals from the base stations 140a-140i may then be initiated (for example, in action S108) in the recent-most assigned PRBs 302a-302N. In some non-limiting examples the obtaining (in action S102), the determining (in action S104), and the assigning (in action S106) are periodically repeated once every 10 minutes, or once every hour, for example depending on changes in data traffic demands, data traffic patterns, etc.

Within one cell, it is theoretically possible that there are terminal devices 160a, 160b, 160c of different respective maximum transmission and reception bandwidths. If such terminal devices 160a, 160b, 160c are served within one cell, further approaches might be used to split the PRBs into sets for CSI-RS transmission. However, in practice, the transmission bandwidth is configured by the base station serving the terminal devices 160a, 160b, 160c in the cell, and all terminal devices 160a, 160b, 160c in the cell should follow the configuration.

Since reports from the terminal devices 160a, 160b, 160c are utilized when determining how many sets the PRBs are to be grouped into, the herein disclosed embodiments are transparent with respect to the actual shapes of the cells. Hence, the herein disclosed embodiments are not limited to cells of hexagonal shape as in the illustrative examples of FIG. 2 and FIG. 4.

According to the herein disclosed embodiments it has in some aspects been assumed that each cell has a 2-dimensional shape and thus that no more than four sets of PRBs 310-340. It is envisioned that the base stations 140a-140 might serve the terminal devices 160a, 160b, 160c in 3-dimensional cells. For 3-dimensional cells it might not be enough to use four sets of PRBs 310-340. However, the embodiments as disclosed herein are applicable also to 3-dimensional cells by considering the principles of higher dimensional planar coloring as disclosed in the document "Higher dimensional analogues of the map colouring problem" by Bhaskar Bagchi and Basudeb Datta in The American Mathematical Monthly, Vol. 120, No. 8 (October 2013), pp. 733-737.

Figure 5:
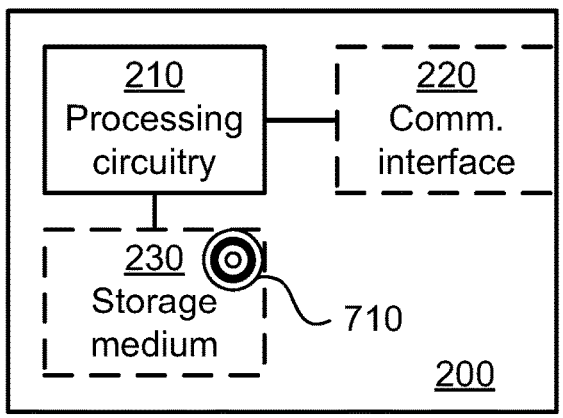
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of actions, operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communication network 100, such as the base stations 140a-140i and/or the terminal devices 160a, 160b, 160c. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
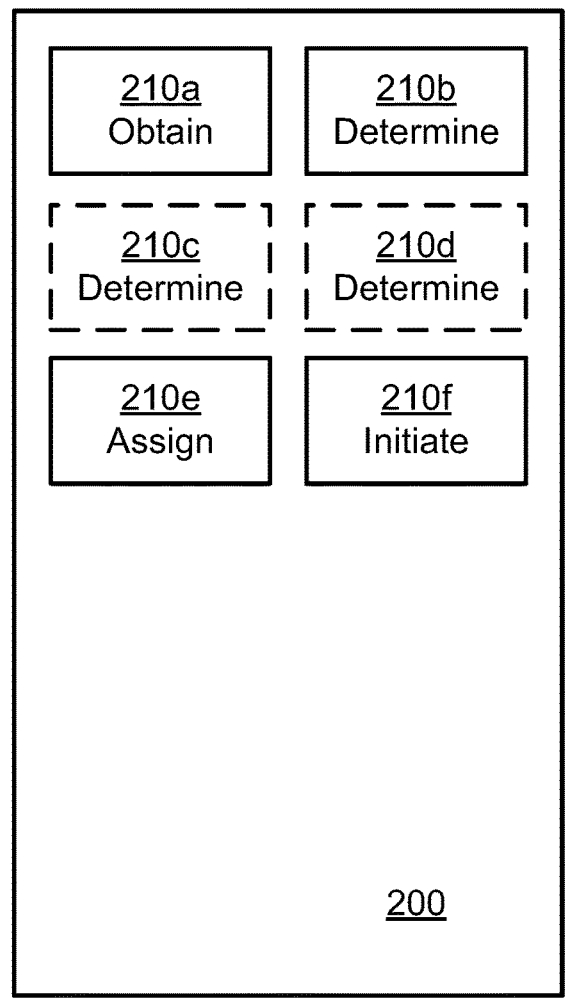
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a number of functional modules; an obtain module 210a configured to perform action S102, a determine module 210b configured to perform action S104, an assign module 210e configured to perform action S106, and optionally an initiate module 210f configured to perform action S108. The network node 200 of FIG. 6 may further comprise a number of optional functional modules, such as any of a determine module 210c configured to perform action S104a, and a determine module 210d configured to perform action S104b. In general terms, each functional module 210a-210f may in one embodiment be implemented only in hardware and in another embodiment with the help of software, i.e., the latter embodiment having computer program instructions stored on the storage medium 230 which when run on the processing circuitry makes the network node 200 perform the corresponding actions mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any actions as disclosed herein.

The network node 200 may be provided as a standalone device or as a part of at least one further device. For example, the network node 200 may be provided in a node of the radio access network or in a node of the core network, as schematically illustrated in FIG. 1. For example, the network node 200 may be collocated with the base station 140a. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 720 of FIG. 7.

Figure 7:
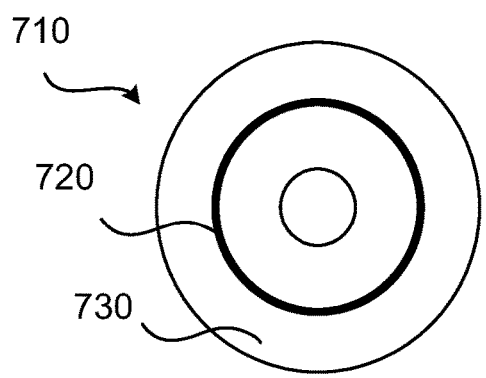
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any action, operation, or step as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

Figure 8:
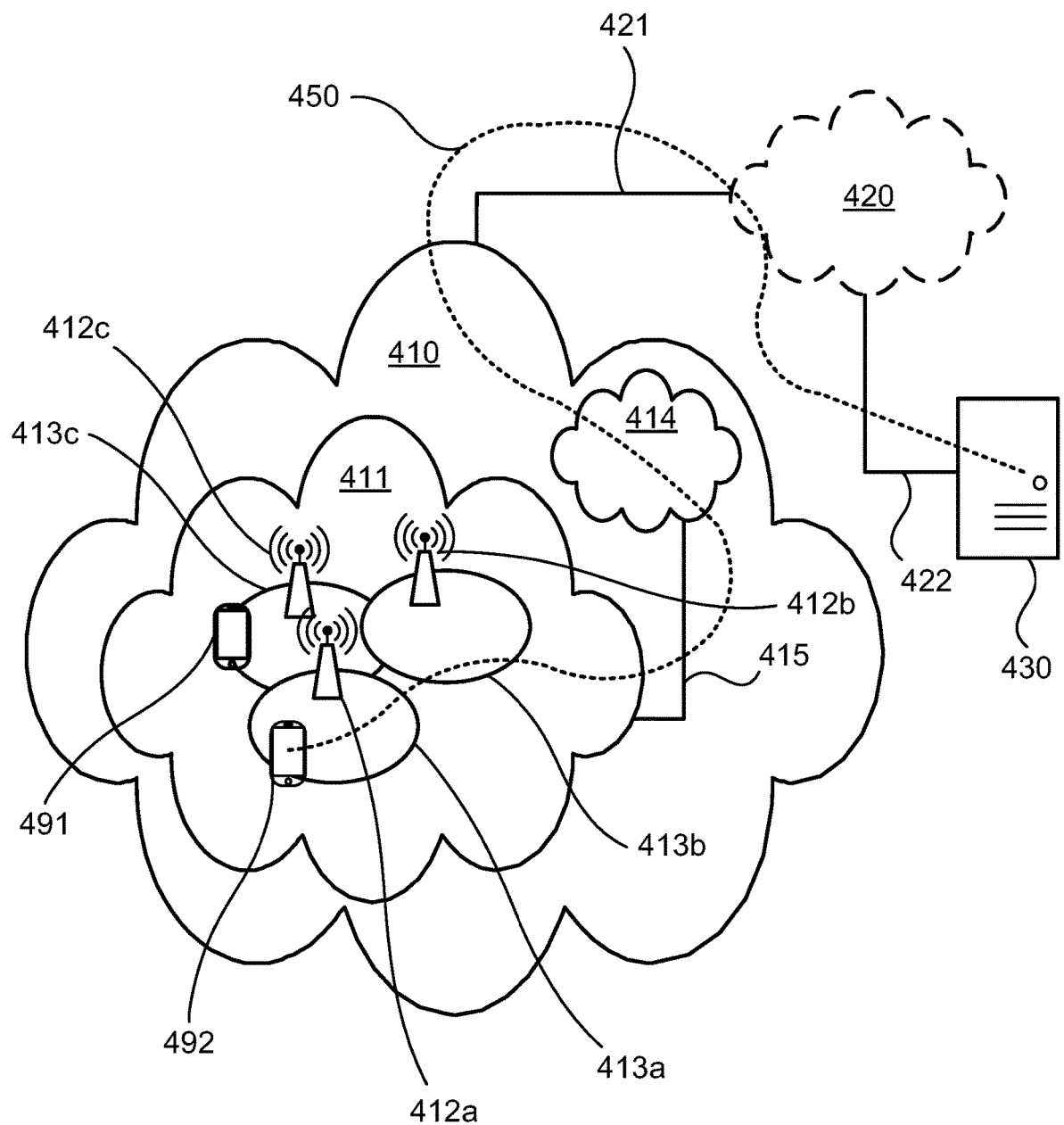
FIG. 8 is a schematic diagram illustrating a telecommunication network connected via an intermediate network to a host computer in accordance with some embodiments.

FIG. 8 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network no in FIG. 1, and core network 414, such as core network 120 in FIG. 1. Access network 411 comprises a plurality of base stations 412a, 412b, 412c, such as NBs, eNBs, gNBs (each corresponding to the base stations 140a-140i of FIGS. 1, 2, and 4) or other types of wireless access points, each defining a corresponding coverage area, or cell, 413a, 413b, 413c. Each base station 412a, 412b, 412c is connectable to core network 414 over a wired or wireless connection 415. A first terminal device 491 located in coverage area 413c is configured to wirelessly connect to, or be paged by, the corresponding network node 412c. A second terminal device 492 in coverage area 413a is wirelessly connectable to the corresponding network node 412a. While a plurality of terminal devices 491, 492 are illustrated in this example, the disclosed embodiments are equally applicable to a situation where a sole terminal device is in the coverage area or where a sole terminal device is connecting to the corresponding network node 412. The terminal devices 491, 492 correspond to the terminal device 160a, 160b, 160c of FIGS. 1, 2, and 4.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected terminal devices 491, 492 and host computer 430. The connectivity may be described as an over-the-top (OTT) connection 450. Host computer 430 and the connected terminal devices 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected terminal device 491. Similarly, network node 412 need not be aware of the future routing of an outgoing uplink communication originating from the terminal device 491 towards the host computer 430.

Figure 9:
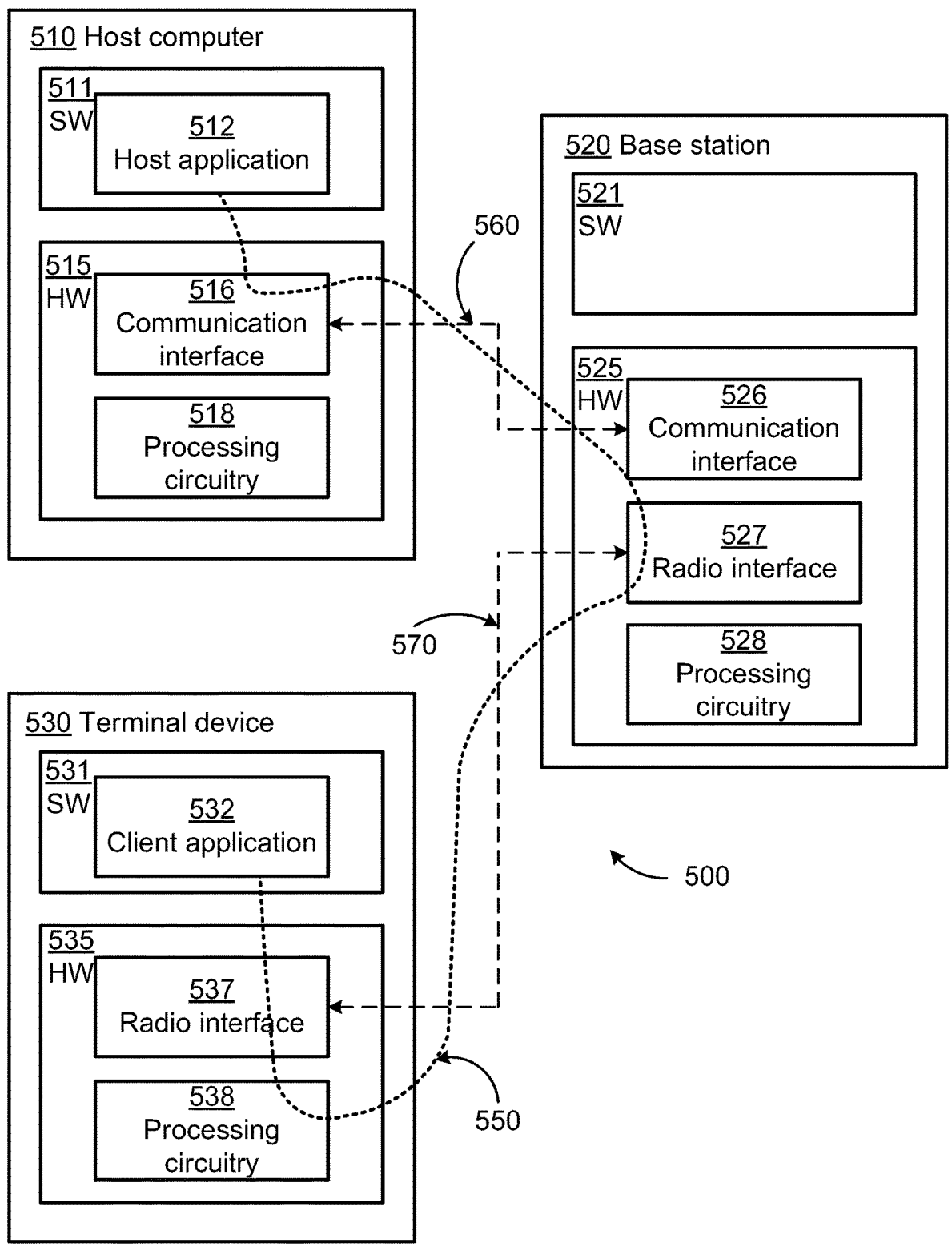
FIG. 9 is a schematic diagram illustrating host computer communicating via a network node with a terminal device over a partially wireless connection in accordance with some embodiments.

FIG. 9 is a schematic diagram illustrating host computer communicating via a network node with a terminal device over a partially wireless connection in accordance with some embodiments. Example implementations, in accordance with an embodiment, of the terminal device, network node and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as terminal device 530 connecting via OTT connection 550 terminating at terminal device 530 and host computer 510. The terminal device 530 corresponds to the terminal devices 160*a*, 160*b*, 160*c* of FIGS. 1, 2, and 4. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with terminal device 530. The base station 520 corresponds to the base stations 140*a*-140*i* of FIGS. 1, 2, and 4. Hardware 525 may include communication interface 526 for setting up and maintaining a wired or wireless connection with an interface of a different communication device of communication system 500, as well as radio interface 527 for setting up and maintaining at least wireless connection 570 with terminal device 530 located in a coverage area (not shown in FIG. 9) served by network node 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes terminal device 530 already referred to. Its hardware 535 may include radio interface 537 configured to set up and maintain wireless connection 570 with a base station serving a coverage area in which terminal device 530 is currently located. Hardware 535 of terminal device 530 further includes processing circuitry 538, which may comprise one or more programmable processors, application-specific integrated circuits, field programmable gate arrays or combinations of these (not shown) adapted to execute instructions. Terminal device 530 further comprises software 531, which is stored in or accessible by terminal device 530 and executable by processing circuitry 538. Software 531 includes client application 532. Client application 532 may be operable to provide a service to a human or non-human user via terminal device 530, with the support of host computer 510. In host computer 510, an executing host application 512 may communicate with the executing client application 532 via OTT connection 550 terminating at terminal device 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, network node 520 and terminal device 530 illustrated in FIG. 9 may be similar or identical to host computer 430, one of network nodes 412*a*, 412*b*, 412*c* and one of terminal devices 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and terminal device 530 via network node 520, without explicit reference to any intermediary devices and the precise routing of messages via these devices. Network infrastructure may determine the routing, which it may be configured to hide from terminal device 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between terminal device 530 and network node 520 is in accordance with the teachings of the embodiments described throughout this disclosure. One or more of the various embodiments improve the performance of OTT services provided to terminal device 530 using OTT connection 550, in which wireless connection 570 forms the last segment. More precisely, the teachings of these embodiments may reduce interference, due to improved classification ability of airborne terminal devices which can generate significant interference.

A measurement procedure may be provided for the purpose of monitoring data rate, latency and other factors on which the one or more embodiments improve. There may further be an optional network functionality for reconfiguring OTT connection 550 between host computer 510 and terminal device 530, in response to variations in the measurement results. The measurement procedure and/or the network functionality for reconfiguring OTT connection 550 may be implemented in software 511 and hardware 515 of host computer 510 or in software 531 and hardware 535 of terminal device 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to network node 520. Such procedures and functionalities may be known and practiced in the art. In certain embodiments, measurements may involve proprietary terminal device signaling facilitating host computer's 510 measurements of throughput, propagation times, latency and the like.

The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for assigning physical resource blocks to base stations in a cell deployment for transmission of downlink reference signals, the method being performed by a network node, the method comprising:
   obtaining reports from terminal devices in the cell deployment, each report indicating location-wise signal strength measurements of base stations for one of the terminal devices;
   determining, based on the obtained reports, whether to group the physical resource blocks in four sets of physical resource blocks or to group the physical resource blocks in less than four sets of physical resource blocks, the determining comprising determining occassionality of inter cell interference for the base stations from the signal strength measurements, and whether to group the physical resource blocks in four sets of physical resource blocks or to group the physical resource blocks in less than four sets of physical resource blocks being determined in accordance with the occassionality of inter cell interference; and
   assigning the determined four or less sets of physical resource blocks to the base stations such that no two adjacent cells in the cell deployment are assigned the same set of physical resource blocks for transmission of downlink reference signals.

2. The method according to claim 1, further comprising initiating transmission of the downlink reference signals from the base stations in the assigned physical resource blocks.

3. The method according to claim 1, wherein the reports are obtained in response to the terminal devices having performed an automatic neighbour relation, ANR, procedure.

4. The method according to claim 1, wherein the determining comprises:
   determining inter cell interference levels for the base stations from the signal strength measurements, and
   wherein whether to group the physical resource blocks in four sets of physical resource blocks or to group the physical resource blocks in less than four sets of physical resource blocks is determined in accordance with the inter cell interference levels.

5. The method according to claim 1, wherein the signal strength measurements for said one of the terminal devices are neighbouring cell measurements of its serving base station and of any neighbouring base station at the given location in the cell deployment.

6. The method according to claim 1, wherein the signal strength measurements are provided in terms of reference signal received power, RSRP, values.

7. The method according to claim 6, wherein the physical resource blocks are grouped in four sets of physical resource blocks when the reports from at least one of the terminal devices indicate RSRP values higher than a power threshold value for more than three base stations.

8. The method according to claim 6, wherein the physical resource blocks are grouped in 0<K<4 sets of physical resource blocks when the reports from at least one of the terminal devices indicate RSRP values higher than a power threshold value for more than K−1 base stations and no report indicates RSRP values higher than the power threshold value for more than K base stations.

9. The method according to claim 6, wherein the determining only is made for the signal strength measurements of those base stations for which the signal strength measurements have RSRP values higher than a power threshold value.

10. The method according to claim 6 wherein the determining only is made for the signal strength measurements as averaged over time.

11. The method according to claim 1, wherein the physical resource blocks per time unit are frequency-wise grouped in the four or less sets of physical resource blocks.

12. The method according to claim 1, wherein the physical resource blocks are grouped in frequency-wise contiguous groups of physical resource blocks.

13. The method according to claim 1, wherein the physical resource blocks are grouped in frequency-wise non-contiguous groups of physical resource blocks.

14. The method according to claim 1, wherein the physical resource blocks are grouped in a mix of frequency-wise contiguous groups and non-contiguous groups of physical resource blocks.

15. The method according to claim 1, wherein the downlink reference signals are channel state information reference signals, CSI-RS.

16. The method according to claim 1, wherein the downlink reference signals are to be transmitted during a beam management procedure and are dedicated for beam measurement purposes.

17. The method according to claim 1, wherein the cell deployment is a cluster of cells that are part of a cellular network.

18. The method according to claim 1, wherein the obtaining, the determining, and the assigning are periodically repeated, and wherein transmission of the downlink reference signals from the base stations is initiated in the recent-most assigned physical resource blocks.

19. A network node for assigning physical resource blocks to base stations in a cell deployment for transmission of downlink reference signals, the network node comprising processing circuitry, the processing circuitry being configured to cause the network node to:
   obtain reports from terminal devices in the cell deployment, each report indicating location-wise signal strength measurements of base stations for one of the terminal devices;
   determine, based on the obtained reports, whether to group the physical resource blocks in four sets of physical resource blocks or to group the physical resource blocks in less than four sets of physical resource blocks, the determining comprising determining occassionality of inter cell interference for the base stations from the signal strength measurements, and whether to group the physical resource blocks in four sets of physical resource blocks or to group the physical resource blocks in less than four sets of physical resource blocks being determined in accordance with the occassionality of inter cell interference; and
   assign the determined four or less sets of physical resource blocks to the base stations such that no two adjacent cells in the cell deployment are assigned to the same set of physical resource blocks for transmission of downlink reference signals.

20. The network node according to claim 19, the processing circuitry further configured to initiate transmission of the downlink reference signals from the base stations in the assigned physical resource blocks.

21. A non-transitory computer storage medium storing a computer program comprising computer program code which, when run on a network node, causes the network node to:
- obtain reports from terminal devices in the cell deployment, each report indicating location-wise signal strength measurements of base stations for one of the terminal devices;
- determine, based on the obtained reports, whether to group the physical resource blocks in four sets of physical resource blocks or to group the physical resource blocks in less than four sets of physical resource blocks, the determining comprising determining occassionality of inter cell interference for the base stations from the signal strength measurements, and whether to group the physical resource blocks in four sets of physical resource blocks or to group the physical resource blocks in less than four sets of physical resource blocks being determined in accordance with the occassionality of inter cell interference; and
- assign the determined four or less sets of physical resource blocks to the base stations such that no two adjacent cells in the cell deployment are assigned to the same set of physical resource blocks for transmission of downlink reference signals.

* * * * *